United States Patent [19]

Curtis

[11] 4,030,695
[45] June 21, 1977

[54] PULSE FOG GENERATOR

[75] Inventor: Russell R. Curtis, Indianapolis, Ind.

[73] Assignee: Curtis Dyna Products Corporation, Westfield, Ind.

[22] Filed: Jan. 21, 1976

[21] Appl. No.: 650,860

Related U.S. Application Data

[62] Division of Ser. No. 492,035, July 26, 1974, Pat. No. 3,993,582.

[52] U.S. Cl. .......................... 251/113; 137/614.19; 251/122; 251/241; 251/326
[51] Int. Cl.² .................. F16K 13/00; F16K 25/00; F16K 35/02
[58] Field of Search .......... 251/113, 122, 241, 246, 251/326, 327, 335 R; 137/614.19

[56] References Cited

UNITED STATES PATENTS

| 1,027,061 | 5/1912 | Norling | 251/113 X |
| 1,322,076 | 11/1919 | Wheaton | 251/241 X |
| 1,444,549 | 2/1923 | Merrill | 251/241 |
| 1,507,718 | 9/1924 | Rilling | 251/241 |
| 2,360,603 | 10/1944 | Ward | 251/246 X |
| 3,306,570 | 2/1967 | Cooksley | 251/335 R X |
| 3,333,812 | 8/1967 | Mueller | 251/309 X |
| 3,538,951 | 11/1970 | Bownass | 251/122 X |

FOREIGN PATENTS OR APPLICATIONS

| 1,201,141 | 9/1965 | Germany | 251/335 |
| 1,147,810 | 4/1963 | Germany | 251/327 |

Primary Examiner—Martin P. Schwadron
Assistant Examiner—Gerald A. Michalsky
Attorney, Agent, or Firm—Woodard, Weikart, Emhardt & Naughton

[57] ABSTRACT

Disclosed is a portable, pulse-jet engine powered fog producing device in which the valve controlling the flow of the fluid forming the fog is of simplified construction utilizing a mating conical cavity and a conical, resilient valve member which is also provided with an integral shoulder forming a dynamic seal for the valve stem with respect to the valve body. A manual lever, having a unidirectional connection to the valve stem, has a locking and "dead man" feature.

2 Claims, 7 Drawing Figures

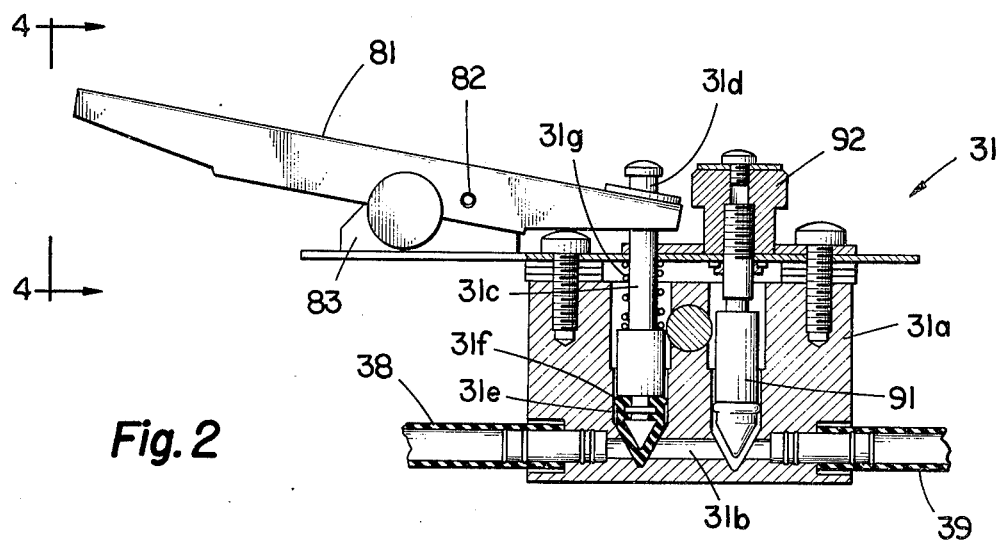
Fig. 2
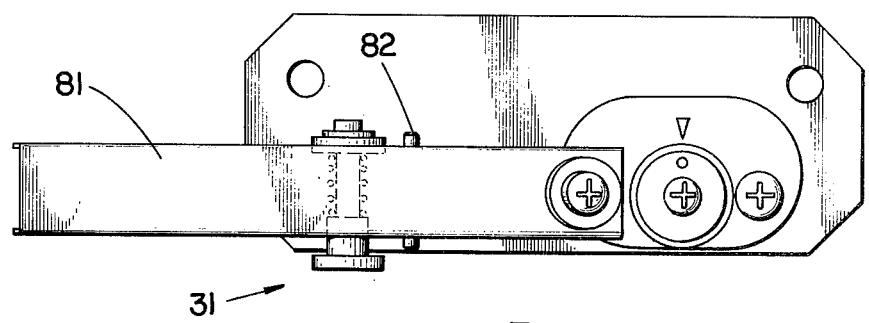
Fig. 3
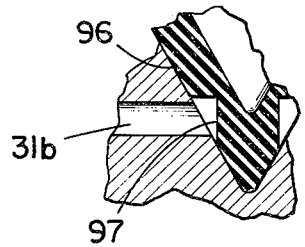
Fig. 7
Fig. 6
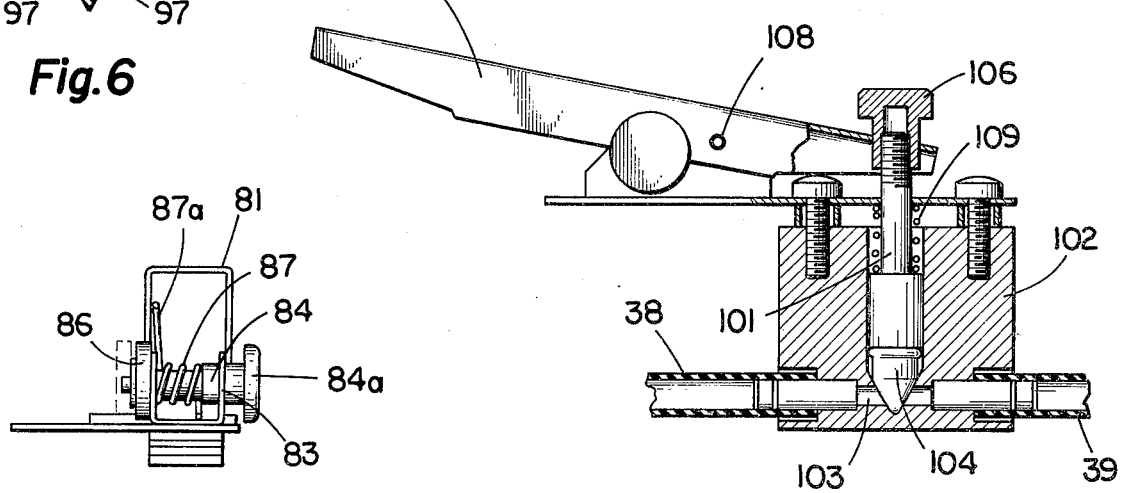
Fig. 4
Fig. 5

PULSE FOG GENERATOR

BACKGROUND OF THE INVENTION

This application is a division of my copending U.S. Pat. application Ser. No. 492,035, filed July 26, 1974, now U.S. Pat. No. 3,993,582, titled "Pulse Fog Generator".

Fogging devices, used to generate an insecticide fog, for example, and utilizing the pulse-jet (resonant intermittent combustion) principle, are well known in the prior art. An example of such structure is disclosed in Tenney et. al. U.S. Pat. No. 2,857,322 and the pulse jet engine operation is there explained in some detail. A fogging apparatus utilizing a resonant, intermittent combustion device, a fuel supply, an insecticide supply and a starting device is disclosed in Curtis U.S. Pat No. 3,151,454. The apparatus of the present invention represents an improved version of such prior art devices.

The apparatus of the present invention utilizes an improved control valve, metering the flow of insecticide at a selected rate, which has an integrally formed conically shaped valve member of a suitable elastomeric material with a circular bead above the conical portion so that sealing of both the stem and the valve seat is accomplished by the single valve member. The apparatus is provided with additional constructional improvements referred to in the subsequent, detailed description of the device.

BRIEF DESCRIPTION OF THE DRAWINGS

FIG. 2 is a side sectional view of the manually operated insecticide fluid control valve component shown in FIG. 1.

FIG. 3 is a top plan view of the structure shown in FIG. 2.

FIG. 4 is an end view of the handle structure shown in FIG. 3 and taken generally along the line 4—4 of FIG. 2.

FIG. 5 is a side sectional view of an insecticide fluid control valve which is a modified form of the valve shown in FIG. 2 and utilizing only one valve closure member.

FIG. 6 is a side view, partially in section, illustrating a modified form of the valve closure shown in both FIGS. 2 and 5.

FIG. 7 is an enlarged, fragmentary view of the valve closure member of FIG. 6 seated in the conical cavity in the valve body.

DESCRIPTION OF THE PREFERRED EMBODIMENTS

Figure 1:
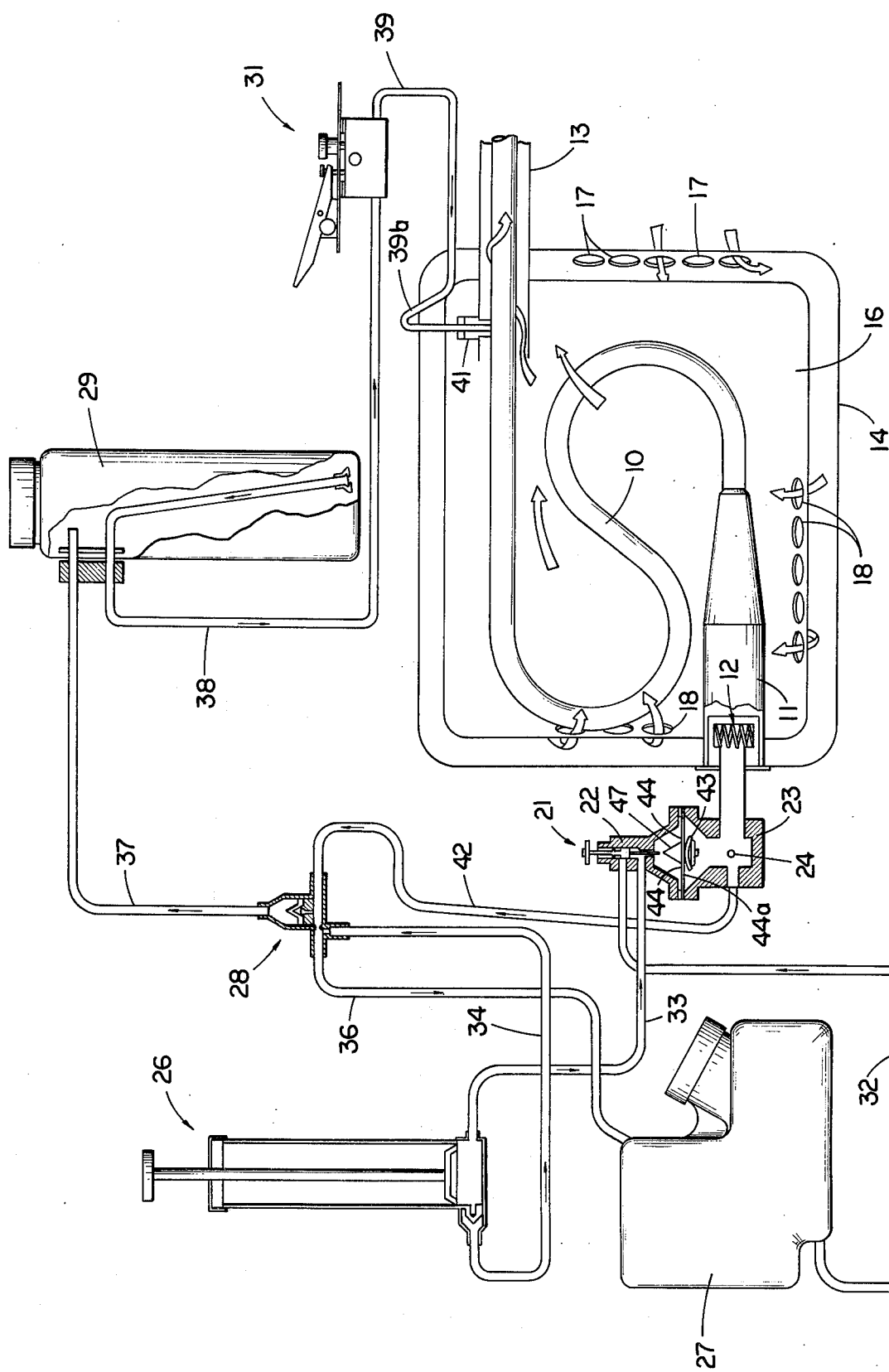
FIG. 1 is a schematic illustration of the pulse fog generator of the present invention.

Referring primary to FIG. 1, the various components of the pulse fog generator device are schematically shown with interconnecting tubing. The apparatus includes a sinuous exhaust tube 10, communicating at one end with a combustion chamber 11, the combustion chamber having an electric glow coil, known in the prior art, identified at 12 and functioning as a flame holder. The other end of the sinuous tube extends through a discharge conduit or tube 13. The end of the sinuous tube 10 is spaced from the discharge tube 13 to provide an annular air passage to atmosphere.

The exhaust tube 10, although sinuous, lies in a single vertical plane and is enclosed with a flat, generally rectangular outer housing 14 and an inner housing 16 having the same general configuration as the housing 14 but nested in the outer housing, the walls of the housing 14 and 16 being spaced from each other. The outer housing 14 is provided with a series of air intake apertures 17 which function to admit air into the space between the housings. It will be noted that the discharge tube 13 extends from and is in communication with the interior of the housing 16 but extends through the housing 14 in sealed relation thereto. The inner housing 16 is provided with air intake apertures 18 and, it will be noted, these are below the sinuous exhaust tube 10. Cooling convection currents of air move through the apertures 17, through the apertures 18, sweep over the sinuous tube 10 and exit through the annular space within the discharge tube 13, and since they are gravity induced, these convection air currents circulate whether or not the resonant intermittent combustion device is in operation, the convection air currents thus serving to cool the exhaust tube rapidly after shut down of the combustion device. As previously mentioned the exhaust tube 10 has a sinuous configuration. Since a design-specified length of the exhaust tube must be retained to produce satisfactory noise level and operating characteristics in a pulse-jet engine, the sinuous configuration provides a means for incorporating the required exhaust tube length in relatively restricted space. The sinuous exhaust tube 10 differs from prior art structures, however, in that the longitudinal centerline of the combustion chamber 11 and formed tube 10 lie in a single common plane thus making possible the utilization of the relatively flat, vertically disposed tube housing 14 and 16 and the thin overall contour of the complete assembly.

The hottest portions of the exhaust tube 10, during engine operation are at the radiused ends of the sinuous tubes and, as will be evident from FIGS. 1 and 6, the air intake apertures 17 in the outer housing 14 and one set of apertures 18 in the inner housing 16 are located adjacent the tube bends. It will also be apparent from FIG. 1 that the combustion chamber and attached exhaust tube entrance are located at a lower corner of the nested housings 14 and 16. The cooling air moving along the outside of tube 10 is discharged from the tube 13 adjacent an upper, diagonally opposite corner of the nested housings. The hottest operating area of the engine, combustion chamber 11, is thus placed near the bottom of the engine housings and removed from the air intake apertures 17 and the air discharge tube 13. This arrangement has particular utility in that it is conductive to dissipating engine heat by convection air flow after the engine has been shut down. During engine operation and, particularly, after engine shut down air entering housing 14 through the set of apertures 18, just below combustion chamber 11, receives heat from the combustion chamber, rises and moves over the sinuous tube 10 and out the tube 13. This produces a relatively rapid cooling of the engine after shut down, eliminating the undesirable post shut down temperature rise of the engine and adjacent parts which is characteristic of prior art devices. The convection flow of cooling air described, it will be noted, continues after engine shut down and until the engine has cooled. This utilization of thermal convection to provide cooling air after engine shut down is a unique feature of the structure herein described.

Flow of fuel and air into the combustion chamber 11 is controlled by a fuel control valve indicated generally at 21 having an upper portion 22 and a lower portion 23. An electrical spark ignition means having electrodes extending into the combustion antechamber 46 is identified at 24. A manually operable charging air pump is indicated generally at 26 and a combustion fuel supply tank is indicated at 27. A check valve indicated generally at 28 functions to pressurize the upper portion of the insecticide fluid reservoir or tank 29.

A manually adjustable insecticide fluid metering valve is indicated generally at 31, the valve 31 controlling the movement of insecticide fluid into the gases discharged through the exhaust tube 10, these gases issuing as insecticide fog from the discharge tube 13. A fuel supply line 32 connects the fuel tank 27 with the fuel valve 21. Air is supplied through the valve 21 from atmosphere when the combustion device is in operation, however, upon start-up, air is supplied to the combustion chamber through the valve 21 by means of the air tube or conduit 33 which receives air from the manual pump 26 when operated. The pump 26 also supplies air through the tube 34 to the intake side of the valve 28. Air pressure, through the tube 36 is thus present in the upper portion of the fuel tank 27 and, thus, pressurization of the interior of the fuel tank occurs to assure fuel feeding. Air is also supplied through the tube 37 for pressurizing the upper portion of the insecticide fluid tank 29 thereby assuring the flow of insecticide through the tube 38 to the valve 31. The tube 39 leads from the outlet of the valve 31 to the insecticide fluid injection fitting 41. During operation of the combustion device, that is, after initial start-up, the tube 42 supplies combustion chamber pressure, through the body of valve 28, to the tube 36 for pressurizing the fuel tank 27 and insecticide tank 29 after manipulation of the hand pump 26 has ceased, it being understood that, as is conventional, the hand pump is utilized merely to supply start-up combustion air and to initially pressurize the fuel tank.

The valve 21 includes a conventional petal valve 43 which permits one-way introduction of a combustible fuel air mixture through the apertures 44 into the combustion antechamber 46, the apertures 44 functioning as combustion chamber pressure controlled fuel delivery apertures. The valve also includes a conical deflector 47.

The valve 21, combustion chamber 11 and exhaust tube 10 function in conventional fashion as a resonant intermittent combustion device. The operation of such combustion devices is well known in the prior art and is explained in detail in Tenney et al U.S. Pat. No. 2,857,332. After initial ignition of the air-fuel charge, pulsating combustion is maintained by the engine without the necessity of further operation of the ignition means with the exhaust gases moving through the sinuous tube 10 and out the discharge end of the tube.

The insecticide fluid control valve 31 will now be described in detail with reference to FIGS. 2, 3 and 4. The control valve 31 includes a housing 31a having a rectilinear fluid flow passage 31b, which is circular in cross section, extending through the housing. Supported in a suitable bore in the housing is a valve member 31c, the valve member, however, being adjustably movable within the bore transversely to the passage 31b. A conical cavity is formed in the housing having a longitudinal axis which intersects the centerline of the passage 31b, the junction of the passage and the conical cavity lying completely upon the inclined side surface of the conical cavity. The valve member 31c includes a stem portion 32d which extends exteriorly of the valve housing and carries a valve closure element 31e. The closure element 31e is unitarily molded of rubber or similar elastomeric material and has a conical configuration closely fitting within the conical cavity as indicated in FIG. 2, thus blocking the passage when the stem is in its extreme lower position. The closure element is provided with an integral, generally annular collar 31f spaced above the conical portion of the member. This collar 31f engages the bore within which the valve member moves and provides a dynamic seal for the valve member.

The upper end 31d of the valve member extends freely through an opening in a lever 81 which is generally channel-shaped in cross section as will be evident from FIG. 4. The stem portion 31d carries an enlarge head which has a larger diameter than the aperture through which the stem 31d extends and there is thus provided, at the adjacent end of the lever 81, a one-way or unidirectional connection of the lever and stem so that upward movement of the lever end raises the valve member 31c, however, downward movement of the adjacent end of the lever 81 does not, itself, move the valve member 31c downwardly but permits it to be moved downwardly by the compression spring 31g. The lever 81 is pivoted about the transverse pin 82 which extends through the supporting bracket 83. As may be seen in FIG. 4, a pin 84 having an enlarged head 84a extends freely through an aperture in the supporting bracket 83 and the depending flange portion of the lever 81 is provided with a cut-out portion which accommodates an enlarged shoulder 86 on the pin 84, the shoulder providing a radially extending abutment which, with the parts in the position shown in FIG. 4, closely engages the cut-out portion of the lever 81. When the head 84a of the pin 84 is moved leftwardly, as viewed in FIG. 4, the radial abutment 86 is moved leftwardly to its broken line position of FIG. 4 removing the abutment from engagement with the lever 81 and permitting the lever to be pivoted counter-clockwise, as viewed in FIG. 2, by manually depressing the end of the handle opposite its unidirectional attachment to the valve stem 31d.

A coil spring 87 (FIG. 4) acts as both a torsion and compression spring and functioning as a compression spring serves to bias the pin 84 rightwardly as viewed in FIG. 4 so that the abutment 86 engages and locks the lever 81 against pivotal motion. The end 87a of the spring is extended to engage the underside of the lever 81 and functions to bias the lever in a clockwise direction as viewed in FIG. 2, so that moving the handle portion of the lever 81 downwardly requires overcoming the torsional bias of the spring 87. The spring 87 thus provides a means both urging the assembly into locked position when the handle lever 81 is free and also urging the handle lever into released position so that valve 31e can close. In addition to permitting the operator to immediately stop flow of insecticide, by releasing lever 81 should the engine shut-down for any reason, this arrangement provides a "dead man" effect for the manual control of the insecticide control valve. If the handle lever 81 is released, for any reason, it is immediately re-locked by movement of abutment 86 into engagement with the lever and return of the lever to released position. Manual reopening of the insecticide control valve can again occur only by the two step procedure of pushing head 84a of pin 84 leftwardly (as viewed in FIG. 4) and rocking lever 81 counterclockwise (as viewed in FIG. 2) about its pivot 82.

Referring to FIG. 2, the valve body 31a also accommodates a further valve member 91 which, at its lower end, carries a conical, elastomeric portion which is sized to closely fit into a second conical cavity intersecting the longitudinal axis of the passage 31b. The upper end of the valve member 91 carries a head 92 and adjustment of the head 92 on the member 91 serves to establish the effective length of the valve member and thus the position of the conical lower portion of the valve member in the passage 31b. This establishes the maximum flow of insecticide fluid through the passage 31b to the fluid line 39 after the valve member 31c has been moved to open position by the handle lever 81. The valve member 31c thus functions as an on-off valve and the valve member 91 functions as a metering valve.

Referring to FIGS. 6 and 7, a modified form of the valve members is indicated at 94. The valve member carries a unitarily molded elastomeric member 96 which has a conical configuration and is provided with two diametrically opposite, flattened portions 97. As may best be seen in FIG. 7 the surface area of each of the flattened portions is larger than the area enclosed by the junction of the fluid passage 31b with the margin of the conical cavity receiving the member 96 in the valve body 31a. With this arrangement, when the closure member 96 is in its lowermost position in the conical valve body cavity, the sharpened, and possibly burred, edges of the junction of the passage 31b with the adjacent conical sidewall of the cavity are not contacted by the surface of the elastomeric valve member 96, this being evident from FIG. 7. This arrangement prevents any cutting or abrasion of the elastomeric valve member 96 as it moves into its lowermost or passage-closing position.

Referring to FIG. 5 a form of the insecticide fluid control valve which is modified from that of the structure shown in FIG. 2 will now be described. The structure of FIG. 5 differs, primarily, from that of FIG. 2 in that it utilizes a single valve member 101, movable in the valve housing 102, to control the flow of insecticide fluid through the rectilinear passage 103 in the valve housing. The valve member 101 carries a conically shaped, elastomeric element 104 and structurally is identical to the valve member 31c of FIG. 2. The upper end of the valve member 101 carries an adjustment knob 106 which can be adjusted upwardly or downwardly upon the threaded end of the valve member 101 and establishes the amount of upward travel imparted to the valve member 101 by actuation of the handle lever 107 which is pivoted at 108. The single valve member 101 thus acts as a shut-off valve in its lowermost position and, since its upper most position is limited by the adjustable knob 106 which is picked up by the handle lever 107, it functions also as a metering valve for the insecticide fluid flowing through the passage 103 from the tube 38 to the tube 39. The compression spring 109 serves to bias the valve member 101 into closed position and is the counterpart of spring 31g of FIG. 2.

Prior art devices are customarily provided with an insecticide fluid control valve which includes only a metering valve adjustably threaded into flow obstructing position to determine the maximum rate of flow of fluid, the counterpart of valve member 91 of FIG. 2. Such valves do not provide for shutting the flow of fluid off rapidly should combustion cease in the pulse-jet engine but, instead, require that the adjustable metering element be threaded or turned down to completely closed position. Both of the control valve assemblies (FIG. 2 and FIG. 5) provide, in addition to the metering valve function (establishing a rate of flow of insecticide fluid), an on-off function which permits the flow of insecticide fluid to be immediately shut off by release of the operating handle. Flammable insecticide fluid is thus prevented from escaping to the hot engine exhaust tube upon engine shut-down.

I claim:

1. A control valve for controlling the flow of fog-producing fluid to a pulse fog generator, said control valve including a housing having a rectilinear fluid flow passage which is circular in cross-section extending through the housing, a valve member supported in said housing for adjustable movement transverse to said passage, a conical cavity formed in said housing whose longitudinal axis intersects the centerline of said passage and the junction of said passage and cavity lies wholly upon the inclined side surface of the conical cavity, said valve member including a stem slidable within a bore in said valve body and extending from the valve housing, a valve closure element carried by said stem and unitarily molded of an elastomeric material, said closure element having a conical configuration closely fitting said conical cavity and thus blocking said passage when said stem is in one limiting position, an integral generally annular collar on said closure element spaced above the conical portion thereof and engaging said bore to provide a dynamic seal for said stem, actuating means for moving said stem into and out of said one limiting position, said actuating means including a lever pivotally mounted intermediate its ends, said lever having a unidirectional connection to said portion of said valve stem extending from the valve housing, so that upon manual depression of one end of said lever said valve stem is lifted out of said passage blocking position, and a pin supported for longitudinally axial movement transverse to the plane of pivotal movement of said lever, said pin being engaged by said lever and positioned on the opposite side of the pivotal axis of said lever from said unidirectional connection of the lever and said extending valve stem portion whereby engagement of said lever with said pin limits the pivotal movement of said lever in valve stem lifting direction, said pin carrying a radially extending abutment which, when engaging said lever, prevents pivotal motion of the lever, a coiled spring encircling said pin and exerting an axially directed biasing force thereon urging said pin into a position in which said abutment engages said lever and prevents pivotal motion thereof, one end of said spring extending rectilinearly into abutting relation to said lever, whereby said spring is stressed in compression when said pin is axially moved to disengage said abutment from said lever and is stressed in torsion when subsequently said lever is pivotally moved in valve stem lifting direction.

2. A control valve for controlling the flow of fog-producing fluid to a pulse fog generator, said control valve including a housing having a rectilinear fluid flow passage which is circular in cross-section extending through the housing, a valve member supported in said housing for adjustable movement transverse to said passage, a conical cavity formed in said housing whose longitudinal axis intersects the centerline of said passage and the junction of said passage and cavity lies wholly upon the inclined side surface of the conical cavity, said valve member including a stem slidable within a bore in said valve body and extending from the valve housing, a valve closure element carried by said stem and unitarily molded of an elastomeric material, said closure element having a conical configuration closely fitting said conical cavity and thus blocking said passage when said stem is in one limiting position, said conically configurated portion of said valve closure element being provided with two diametrically opposite flattened portions each having a surface area larger than the area enclosed by the junction of said circular cross-sectioned fluid flow passage and said conical cavity, each of said flattened surface portions being disposed at one of the junctions between said circular cross-sectioned passage and said conical cavity, so that when said closure element is in said one limiting position said cavity and passage junctions are not engaged by said closure element, and an integral generally annular collar on said closure element spaced above the conical portion thereof and engaging said bore to provide a dynamic seal for said stem, and actuating means for moving said stem into and out of said one limiting position.

* * * * *